US008730391B2

(12) United States Patent
Karaoguz et al.

(10) Patent No.: US 8,730,391 B2
(45) **Date of Patent: *May 20, 2014**

(54) ADAPTIVE CONTROL OF LCD DISPLAY CHARACTERISTICS BASED ON VIDEO CONTENT

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 13/477,667

(22) Filed: May 22, 2012

(65) Prior Publication Data

US 2012/0229702 A1 Sep. 13, 2012

Related U.S. Application Data

(63) Continuation of application No. 12/492,692, filed on Jun. 26, 2009, now Pat. No. 8,203,580.

(60) Provisional application No. 61/175,378, filed on May 4, 2009.

(51) Int. Cl.
*H04N 7/01* (2006.01)
*H04N 11/20* (2006.01)

(52) U.S. Cl.
USPC ........... 348/441; 348/554; 348/376; 348/730; 348/725; 348/734; 348/705; 348/706; 348/761; 348/766; 348/451; 348/452; 348/468; 348/155; 345/690; 345/691; 345/692; 345/693; 345/694; 345/695; 345/211; 345/204; 345/87; 725/110; 725/135; 725/132

(58) Field of Classification Search
USPC ......... 348/441, 554, 376, 730, 725, 734, 705, 348/706, 761, 766, 451, 452, 155, 468; 345/87, 204, 211, 690–695; 725/110, 725/135, 132
See application file for complete search history.

(56) References Cited

U.S. PATENT DOCUMENTS

| | | | | |
|---|---|---|---|---|
| 8,203,580 | B2 * | 6/2012 | Karaoguz et al. | 345/690 |
| 2006/0103675 | A1 * | 5/2006 | Takayama | 345/629 |
| 2007/0126745 | A1 * | 6/2007 | Wei et al. | 345/530 |
| 2007/0216709 | A1 * | 9/2007 | Kojima et al. | 345/619 |
| 2008/0259221 | A1 * | 10/2008 | Longchambon et al. | 348/739 |
| 2008/0297615 | A1 * | 12/2008 | Kagawa et al. | 348/222.1 |
| 2010/0277510 | A1 * | 11/2010 | Karaoguz et al. | 345/690 |
| 2011/0084951 | A1 * | 4/2011 | Karhuketo et al. | 345/211 |
| 2011/0138416 | A1 * | 6/2011 | Kang et al. | 725/39 |

* cited by examiner

*Primary Examiner* — Jefferey Harold
*Assistant Examiner* — Mustafizur Rahman
(74) *Attorney, Agent, or Firm* — Garlick & Markison; Bruce E. Garlick

(57) ABSTRACT

Determining video content type of a video displayed on a LCD and triggering adjustment in drive power of the LCD based on the video content type. The video content type indicates relative content motion of the video. A video content type detection module is one or combination of a software and a hardware and directs the LCD to be driven relative slower or faster based upon video content. The module independently or in conjunction with another module identifies an active window from a plurality of windows corresponding to a plurality of applications running on the host device and sets the drive power of the LCD based on speed of a video displayed on the active window. The module may also adapt LCD drive power based upon user input and/or remaining battery life.

21 Claims, 8 Drawing Sheets

ADAPTIVE CONTROL OF LCD DISPLAY CHARACTERISTICS BASED ON VIDEO CONTENT

CROSS-REFERENCE TO PRIORITY APPLICATIONS/INCORPORATION BY REFERENCE

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 12/492,692, entitled, "Adaptive Control of LCD Display Characteristics Based on Video Content," filed Jun. 26, 2009, issued as U.S. Pat. No. 8,203,580, which claims priority pursuant to 35 U.S.C. §119 (e) to the following U.S. Provisional Patent Application which is hereby incorporated herein by reference in its entirety and made part of the present U.S. Utility Patent Application for all purposes:

2. U.S. Provisional Application Ser. No. 61/175,378, entitled, "Adaptive Control of LCD Display Characteristics Based on Video Content," filed May 4, 2009, both of which are incorporated herein by reference in their entirety for all purposes.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

1. Field of the Invention

The present invention relates generally to flat video displays and, more particularly, to the control of Liquid Crystal Displays (LCDs) to achieve power savings.

2. Description of the Related Art

Liquid crystal displays (LCDs) are rapidly displacing traditional cathode-ray tube monitors in popularity because the LCDs take up less space, consume less power and offer crisp text compared to the cathode-ray tube monitors. LCDs work on principle of twisting/polarizing liquid crystal material under the influence of an electric field. With some LCDs, light passes from a backlight source through a first polarizer, passes through a layer of liquid crystals, passes through a colored filter, and then passes through a second polarizer that is oriented 90 degrees from the first polarizer. When light cannot pass through the second polarizer, the pixel appears black. An electric field created around the liquid crystal material twists the LCD material, which bends the light and lines the light up with the second polarizer allowing the light to pass through when the pixel is turned on.

LCD displays are often driven using Thin Film Transistors (TFTs). With displays of this type, TFTs are arranged on a glass substrate immediately below a layer of liquid crystal material pixel elements with each TFT altering the state of liquid crystal material of a corresponding pixel. Driving TFTs to a switched on state causes the corresponding pixel to turn-on. The liquid crystal material of an LCD pixel will usually untwist naturally when a corresponding TFT is not driven. The TFTs can be driven to an off-state and, driving the TFTs rapidly from an off state to an on state is usually required when displaying fast moving images such as video. Rapid switching of the TFTs that is required to display video results in more drive power consumption of the TFTs of the LCD.

When an LCD monitor is used for viewing and editing text, for example, a less expensive, slower, and lower power consuming LCD monitor may be used. A viewer who watches action films and plays graphically intensive video games from time to time may justify the higher cost and power requirements associated with a high speed LCD monitor even though much use of the LCD is for slow moving images, e.g., text editing, web page browsing, etc. With many LCD monitors, LCD pixels are typically driven for maximum speed twisting and untwisting even though such performance is not generally required. Such operation consumes significant power, which is particularly problematic for hand-held devices that are battery powered.

Further limitations and disadvantages of conventional and traditional approaches will become apparent to one of ordinary skill in the art through comparison of such systems with various aspects of the present invention.

BRIEF SUMMARY OF THE INVENTION

The present invention is directed to apparatus and methods of operation that are further described in the following Brief Description of the Drawings, the Detailed Description, and the claims. Other features and advantages of the present invention will become apparent from the following detailed description of the invention made with reference to the accompanying drawings.

BRIEF DESCRIPTION OF THE DRAWINGS

For various aspects of the present invention to be easily understood and readily practiced, various aspects will now be described, for purposes of illustration and not limitation, in conjunction with the following figures.

DETAILED DESCRIPTION

Figure 1:
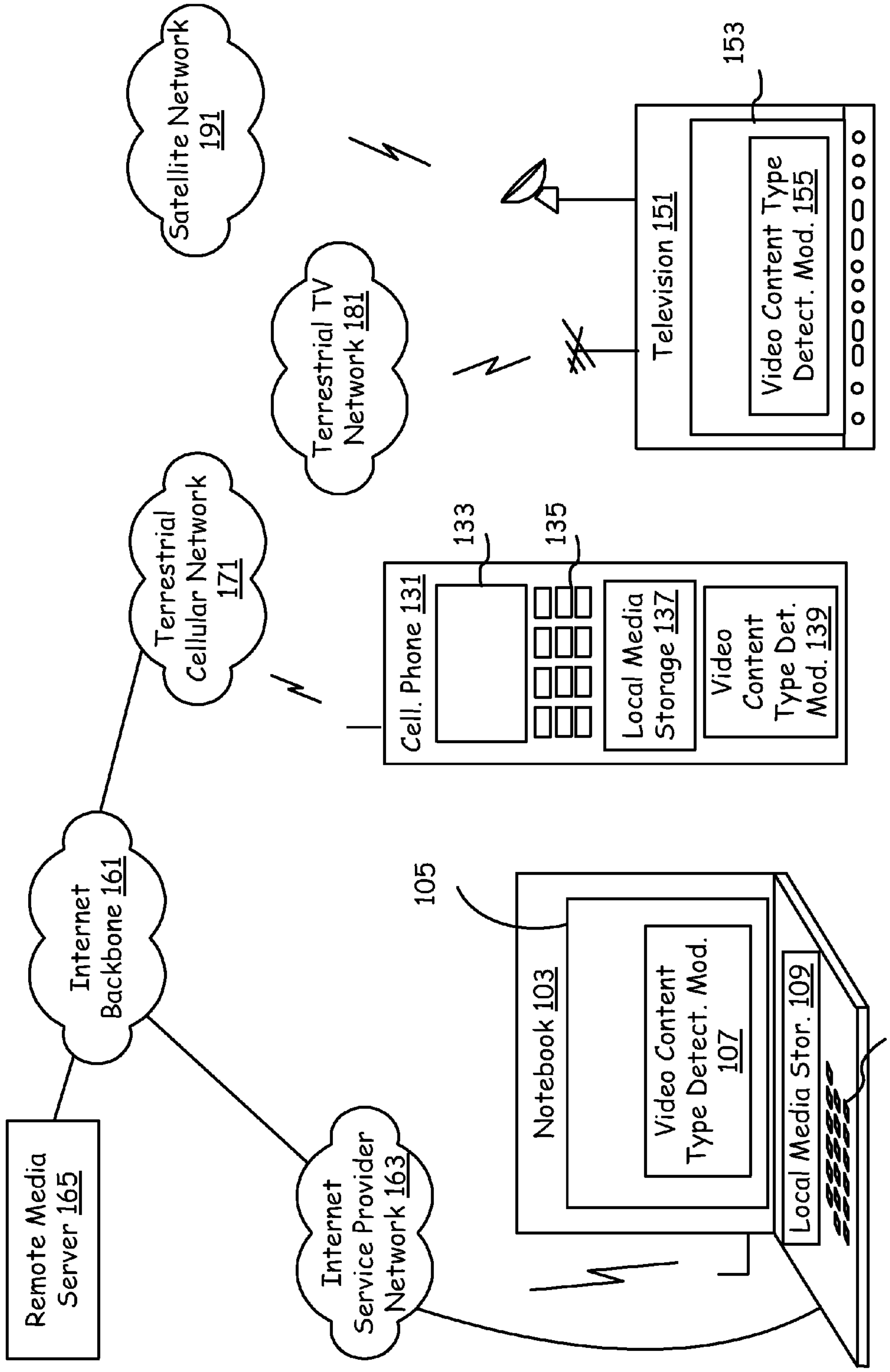
FIG. 1 is a schematic diagram illustrating a plurality of devices, each having a Liquid Crystal Display (LCD) and a graphics card wherein the graphics card changes the display characteristics of the LCD based on content of video displayed on the LCD according to one or more embodiments of the present invention.

FIG. 1 is a schematic diagram illustrating a plurality of devices, each having a Liquid Crystal Display (LCD) and a graphics card wherein the graphics card changes the display characteristics of the LCD based on content of video displayed on the LCD according to one or more embodiments of the present invention. Each of a plurality of devices 103, 131, and 151 includes a LCD and a graphics card wherein the graphics card changes the display characteristics of the LCD based on content of video displayed on the LCD.

A notebook 103 includes a LCD 105, a keypad 111, local media storage 109 and a video content type detection module 107. The notebook 103 is communicatively coupled to a remote media server 165 via an Internet Service Provider (ISP) network 163 and an Internet backbone 161. The notebook 103 receives multimedia content from the remote media server 165 via the ISP network 163 using a wireless connection and/or a wired connection. A cellular phone 131 includes a LCD 133, a user input interface 135, a local media storage 137, and a video content type detection module 139. The user input interface 135 is one or more of a keypad, a touchpad, a pointer, a pen, and/or a touch screen. The cellular phone 131 is attached to a terrestrial cellular network 171. The cellular phone 131 receives multimedia content from the remote media server 165 via the terrestrial cellular network 171 and the Internet backbone 161. The local media storage 109, 137 is on-board memories of the notebook 103 and the cellular phone 131, respectively or removable storage devices. The multimedia content received by the notebook 103 and the cellular phone 131 from the remote media server 165 includes one or combination of real time and/or archived multimedia content such as text, audio, video and picture. The multimedia content stored in the local media storages 109, 137 and the multimedia content received from the remote media server 165 are one of an interactive media such as a video game and a non-interactive media such as a movie, a word processor, a spreadsheet, a recorded video etc. A television 151 includes a LCD 153 and a video content type detection module 155. The television 151 receives television channels from one or both of a terrestrial TV network 181 and a satellite network 191. A television channel is a movie, a music video, a television program, a sporting or other entertainment event, a news report, or any of a variety of units of recorded or live multimedia content.

The notebook 103 includes a graphics card (not shown in the figure) that generates and outputs electric signals to the LCD 105 resulting in display of images on the LCD screen 105. Input to the graphics card is video media content that the notebook 103 retrieves from the local media storage 109 or the remote media server 165. The graphics card generates electric fields that twist or untwist liquid crystal pixel elements corresponding to each pixel of the screen 105 making each pixel appear transparent or dark/colored. The pattern of dark/color and transparent pixels form an image on the LCD 105. Fast-changing images such as those of moving video content requires rapid twisting or untwisting of liquid crystal pixel elements, which requires high drive power. The video content type detection module 107 is communicatively coupled to the graphics card of the notebook 103 and retrieves information regarding content that is currently displayed on the LCD 105 from the graphics card. The information regarding the video content includes one or combination of 1) number of frames displayed per second, and/or 2) color and intensity of each pixel. The video content type detection module 107 instructs the graphics card of the notebook 103 to change drive power of the LCD 105 based on the information regarding the video. The module 107 monitors the information regarding the video content continuously and necessitates a change in the drive power of the LCD 105 accordingly. As a way of example and without limitation, a music video is displayed on the LCD 105. The music video is a slow video and images on the LCD 105 do not change frequently. The module 107 determines how rapidly an image on the LCD 105 changes based on change in pixel intensity and color between successive frames and instructs the graphics card to decrease the drive power of the LCD 105. Decrease in the LCD drive power leads to power saving which is particularly important if the notebook 103 is running on a battery. For example, another music video is not equally slow in every portion of the video. A faster portion of another music video includes images that change very rapidly. The video content type detection module 107 continuously monitors the intensity and color of pixels in each frame and triggers the graphics card to increase the drive power of the LCD 105 during the faster portion of the another music video thereby enabling the liquid crystal pixel elements to twist and untwist rapidly. The module 107 triggers a decrease in the LCD drive power once the faster portion of another music video gets over.

In another embodiment of the present invention, the video content type detection module 107 is adapted to monitor a plurality of videos that are currently displayed on the LCD 105 and trigger a change in LCD drive power accordingly, thereby leading to an optimum usage of power. As an example, a plurality of videos, each in a separate window, are running on the notebook 103. The plurality of videos are, a recorded video running in a first window and a word processor running in a second window. The video content type detection module 107 retrieves information regarding the plurality of videos from the display driver at a first instant of time and determines, as an example, that the second window is active and the first window is in a minimized position. The module 107 further determines rate at which images are changing in the word processor based on the information retrieved from the graphics card. The module 107 instructs the graphics card of the notebook 103 to set the LCD drive power to a value that is sufficient to track changing images in the word processor. A user of the notebook 103 opens the first window at a second instant of time. The module 107 senses a rapid movement of images in the currently active first window based on the information retrieved from the graphics card at the second instant of time. Therefore the module 107 causes an increase in the LCD drive power that is sufficient to track the changing images of the recoded video in the first window. The video content type detection module 107 controls the LCD drive power in one or more of the following ways: 1) the module 107 selects current LCD drive power from a list of predetermined values and informs the graphics card, 2) the module 107 instructs the graphics card to increase or decrease the LCD drive power in steps and the graphics card ascertains LCD drive power depending on number of steps.

In yet another embodiment, a video, or an application such as a word processor, a spreadsheet, a drawing tool etc., currently running on the notebook stores its requirement, for example, the frames per second, in a registry. The video content type detection module 107 retrieves information corresponding to the requirement from the registry and instructs the graphics card to drive the LCD 105 at a power based on the requirement. The module 107 is further adapted to trigger an adjustment in the LCD drive power based on 1) whether the notebook 103 is running on a battery, and 2) remaining power in the battery of the notebook 103 when the notebook 103 is running on the battery. The module 107 causes the graphics card to switch to a lower LCD drive power if the notebook 103 runs on a battery and/or the remaining power in the battery of the notebook 103 goes below a predefined threshold.

The cellular phone 131 and the television 151 comprise video content type detection modules 139 and 155, respectively that are communicatively coupled to respective graphics cards. The modules 139 and 155 trigger the respective graphics cards to adjust drive powers of the LCDs 133 and 153, respectively based on speed of videos currently displayed on the LCDs 133 and 153. The modules 107, 139 and 155 need a finite amount of time to detect characteristics of the videos currently displayed on the LCDs 105, 133 and 153 respectively and to trigger changes in corresponding LCD drive powers. In yet one more embodiment of the present invention, each of the modules 107, 139 and 155 delays respective video by a few frames and performs the detection and the triggering in the meantime. In this embodiment, each of the modules 107, 139 and 155 stores the few frames in a local memory of the respective devices. The local memory can be on-board memory of respective graphics cards. The plurality of devices can be one of a smart phone, a video game box, a personal digital assistant (PDA) and a personal computer apart from being a notebook 103, a cellular phone 131 and a television 151.

Each of the devices 103, 131, and 151 of FIG. 1 are indicated to include a video content detection module. The video content detection module, in some embodiments, is hardware, e.g., circuitry, that determines video content type and that adjusts the drive of the LCD based upon detection. In other embodiments, the video content detection module is one or more software modules running on a host processor of the corresponding device. In still another embodiment, the video content detection module is a combination of hardware and software. The reader should understand that functions performed by the video content detection module require hardware to perform although control of such hardware may be partially or fully enacted using software instructions.

Figure 2A:
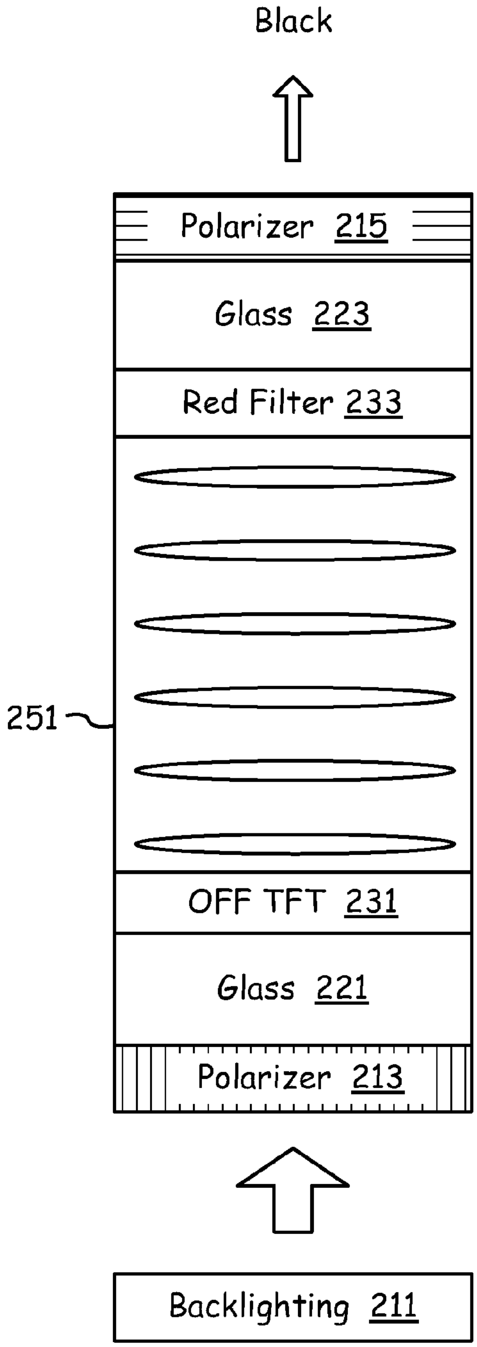
FIGS. 2*a* and 2*b* are block diagrams illustrating operating principle of a thin film transistor LCD.
Figure 2B:
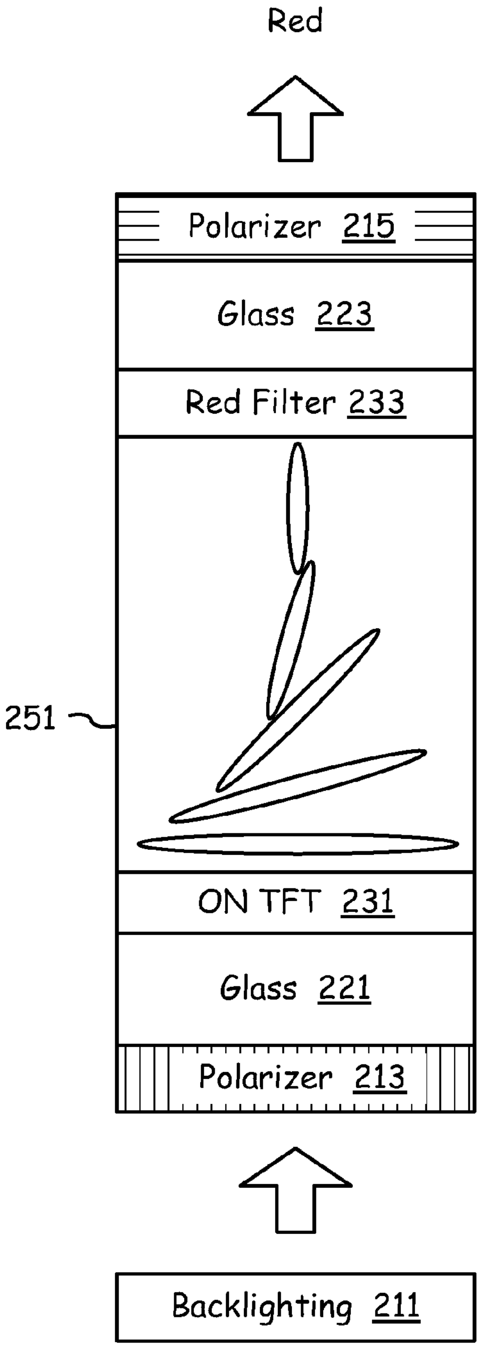

FIGS. 2*a* and 2*b* are block diagrams illustrating operating principle of a thin film transistor LCD. Referring particularly to FIG. 2*a*, a first polarizer 213 and a second polarizer 215 are oriented at 90 degrees to each other. A fluorescent light source, shown as backlight 211 sends light through the first polarizer 213. The light, after getting polarized by the first polarizer 213, passes through a layer 251 that contains a plurality of liquid crystal pixel elements arranged in tiny containers called cells. The cells are arranged in rows across a screen. A pixel on a LCD screen includes one or more than one cells. The cells of a pixel are arranged in horizontal positions in FIG. 2*a*. The polarized light is in a plane parallel to the first polarizer 213 and at 90 degrees to the second polarizer. Therefore the polarized light cannot pass through the second polarizer 215 and the pixel appears dark as no light comes out. No voltage is applied to the TFT 231 as shown in FIG. 2*a*.

The TFT 231 is switched on at a next instant of time as shown in FIG. 2*b*. Referring to FIG. 2*b*, a voltage is applied to the TFT 231. This in turn causes generation of an electric filed near the cells. The cells i.e., the liquid crystal pixel elements (or portions thereof) twist under the influence of the electric field causing a 90 degree bend in the polarized light. The polarized light now passes through the second polarizer 215. There is a red filter 233 in front of the layer 251. Therefore the pixel appears as red. The crystal elements untwist and arrange in horizontal position, as shown in FIG. 2*a*, once the drive voltage is removed. The liquid crystal pixel elements require a finite amount of time to untwist and come back to the horizontal position. This finite amount of time determines how rapidly the liquid crystal pixel elements can twist and untwist and thereby limits maximum speed of a video that can be displayed on the TFT LCD. Alternately a voltage can be applied to the TFT 231 to untwist the twisted crystal elements faster, thereby increasing the maximum allowable speed of the video on the TFT LCD but at the expense of more power. Power consumption by the TFT LCD increases with an increase in the speed of the video that is displayed on the TFT LCD. According to the present invention, based upon video content that is displayed on the LCD, the operation of the LCD is altered. For example, for a first type of video content, first drive settings may be applied to the TFT 231 while for a second type of video content, second drive settings may be applied to the TFT 231. With the first drive settings, the TFT 231 operates more slowly than with the second drive settings but the TFT 231 consumes less power.

Figure 3:
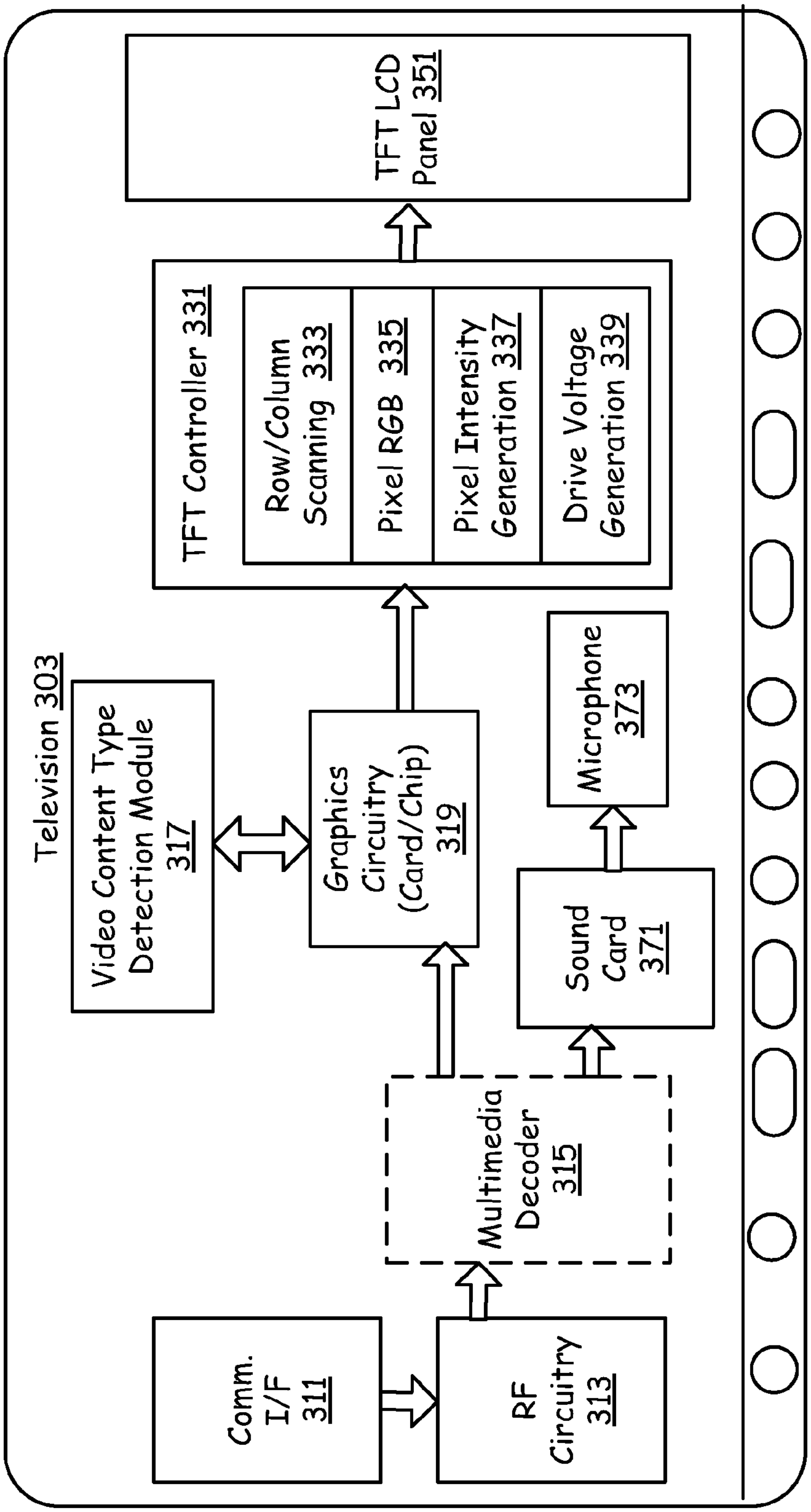
FIG. 3 is a schematic block diagram illustrating a television having a LCD with alterable display characteristics based upon content of video displayed on the LCD according to one or more embodiments of the present invention.

FIG. 3 is a schematic block diagram illustrating a television having a LCD with alterable display characteristics based upon content of video displayed on the LCD according to one or more embodiments of the present invention. A TFT controller 331 changes display characteristics of a LCD 351 based on content of video displayed on the LCD 351. The television 303 includes a communication interface 311. The television receives television channels from a terrestrial TV network and/or a satellite TV network via the communication interface 311. A television channel is a movie, a music video, a television program, a sporting or other entertainment event, a news report, or any of a variety of units of recorded or live multimedia content. An RF signal received by the television 303 via the communication interface 311 conforms to a format, such as analog formats like NTSC format, PAL format and digital format like HDTV format etc. The RF signal includes an audio part and a video part. When the RF signal is an analog signal, the RF circuitry 313 separates the audio part of the RF signal from the video part of the RF signal. The RF circuitry 313 sends the audio part to a sound card 371 that drives a microphone 373 and sends the video part to the graphics circuitry (or graphics card) 319 that drives the TFT controller 331.

A multimedia content decoder 315 receives digital information form the RF circuitry 313 when the received information is in a digital format, decodes, the digital information, and forwards decoded audio part and decoded video part to the audio card 371 and the graphics card 319, respectively. TV channels broadcast in digital format are coded, for example the coding used in HDTV is MPEG-II. Alternately the sound card 371 performs decoding of the audio part and the graphics card 319 performs decoding of the video part. In such a case the multimedia content decoder 315 is not necessary.

Information necessary to display the video part of a TV channel on the LCD 351 such as i) frequency of row and column scanning (or raster scanning), ii) pixel intensity and iii) pixel colors during each raster scan are embedded in the video part of the RF signal. The graphics chip 319 is communicatively coupled to the TFT (thin film transistor) controller 331. The graphics chip 319 generates and sends signals to the TFT controller 331 such that the TFT controller 331 generates appropriate voltages to switch on TFTs. The TFTs are arranged on a glass substrate immediately below a layer of liquid crystal pixel elements. The switched on TFTs twist the liquid crystal pixel elements, thereby creating an image (colored in some embodiments) on the LCD 351. The liquid crystal pixel elements untwist and return to their original state when the TFTs are switched off thereby making the LCD pixels appear black. The TFTs pass through rapid on and off states in order to display a video, i.e., rapidly changing images/pictures/frames, on the LCD 351. The TFT controller 331 generates voltages based on the 1) row and column scanning information and 2) the pixel intensity and color (RGB) information received from the graphics chip 319.

A video content type detection module 317 is communicatively coupled to the graphics chip 319. The module 317 is the additional hardware and/or software that enable the TFT controller 331 to change display characteristics of the LCD 351 based on content of video displayed on the LCD 351. The module 317 determines relative speed of image changes of a video currently being displayed on the LCD 351 by monitoring the how frequently the pixel intensity and colors change between successive raster scans. The pixel intensity and color do not change much between successive raster scans in a slow video. However intensity and color of pixels change rapidly between successive raster scans in case of a fast video thereby requiring liquid crystal pixel elements (or liquid crystal pixels) that have fast response time.

The module 317 instructs the TFT controller 331 via the graphics chip 319 to reduce the TFT voltage drive when a slow video is running on the LCD 351. Drive voltage generation module 339 in the TFT controller 331, in response to the instruction from the module 317, generates a lower voltage to drive the liquid crystal pixels, thereby saving power. For example and without limitation, a sporting event is being telecast on the television 303. The video content type detection module 317 monitors the frames of the video corresponding to the sporting event and determines that current drive voltage setting of the TFT controller 331 is inadequate to display the fast moving sporting event properly. The module 317 triggers the drive voltage generation module 339 in the TFT controller 331 to increase the TFT voltage drive by one or more steps. A range of possible TFT drive voltages may be divided into a plurality of steps. The drive voltage generation module 339 is adapted to increase and decrease the TFT drive voltage levels by the multiples of steps. The TFT controller 331 further includes Row/Column Scanning circuitry 333, Pixel RGB circuitry 335, and pixel intensity generation circuitry 337.

In another embodiment of the present invention, the television 303 supports picture in picture (PIP) functionality. The television 303 displays a first channel in a first window and a second channel in a second window. By way of example, a news report is telecast on the first channel and a movie is telecast on the second channel. A first video corresponding to the news report is a slower video compared to a second video corresponding to the movie. The video content type detection module 317 determines the TFT drive voltages necessary to display the first channel and the second channel on the LCD 351. The second channel has faster moving images than the first channel and requires a higher TFT drive voltage. The TFT drive voltage necessary for proper display of the second channel is thus sufficient for proper display of the first channel but the vice versa is not true. The module 317 triggers the drive voltage generation module 339 to generate high TFT drive voltage that is appropriate for displaying the fast moving second video. At a second instance of time another news report is telecast in the second channel. A lower TFT drive voltage is now sufficient to display the first channel and the second channel properly on the LCD 351 because videos corresponding to news channels are slow videos. The video content type detection module 317 triggers the drive voltage generation module 339 to reduce the TFT drive voltage, thereby saving power.

Figure 4:
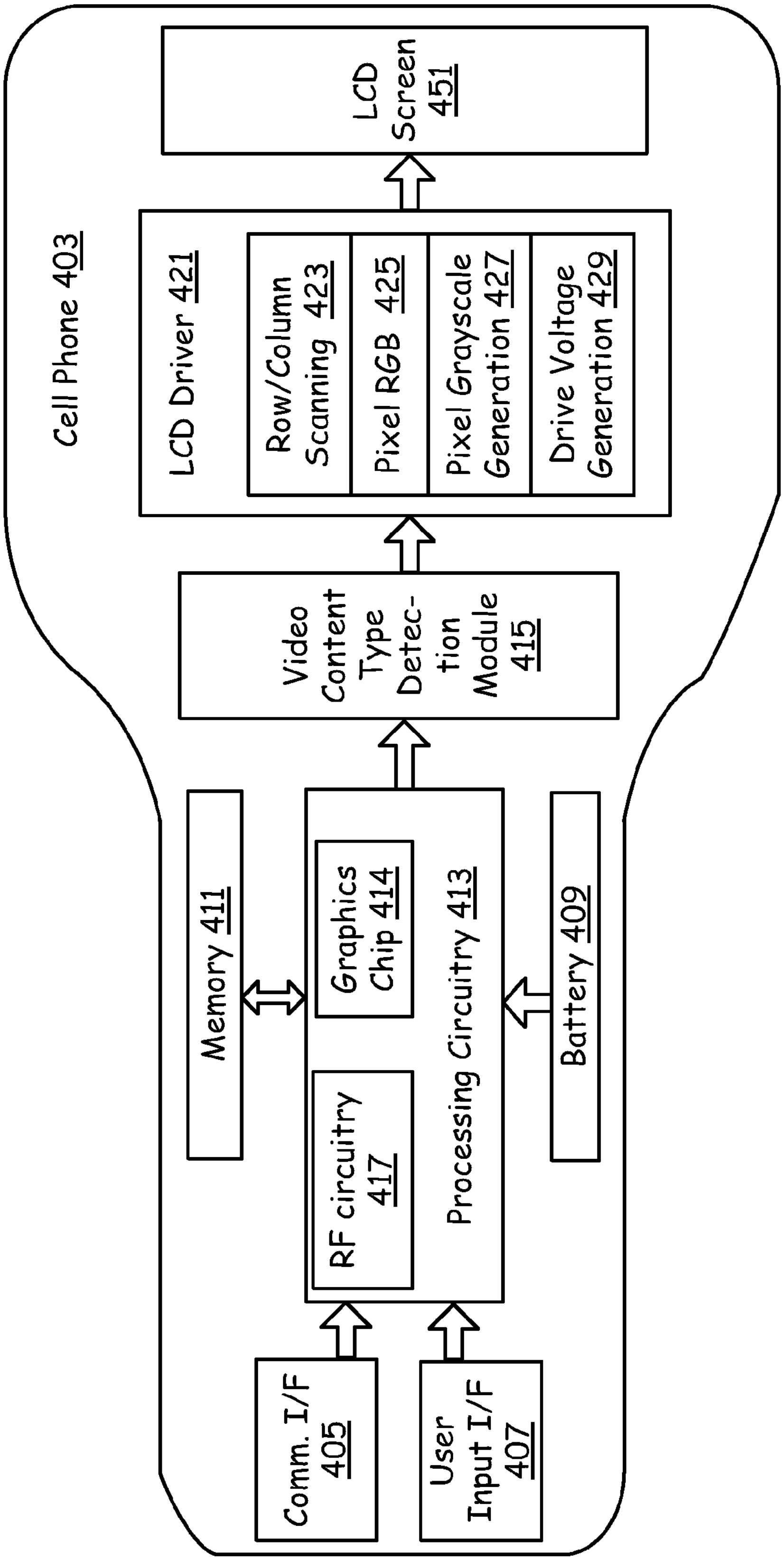
FIG. 4 is a schematic block diagram illustrating a cellular phone having a LCD with alterable display characteristics based upon content of video displayed on the LCD according to one or more embodiments of the present invention.

FIG. 4 is a schematic block diagram illustrating a cellular phone having a LCD with alterable display characteristics based upon content of video displayed on the LCD according to one or more embodiments of the present invention. The cellular phone 403 has a LCD 451 and an LCD driver 421 that changes the display characteristics of the LCD 451 based on content of video displayed. The LCD driver 421 includes a row/column scanning component 423, a pixel RGB component, a pixel grayscale generation component 427, and a drive voltage generation component 429. A battery 409 powers the cellular phone 403. The cellular phone 403 is communicatively attached to a terrestrial cellular phone network (not shown in the figure) and receives multimedia content via a communication interface 405. The communication interface 405 operates in compliance with one or more of a packet switched data network standards, such as GSM (Global System for Mobile Communications), EDGE (Enhanced Data Rates for GSM Evolution), CDMA (Code Division Multiple Access), Bluetooth, WiMax, 3G, CDMA 2000, etc. The multimedia content is received by the cellular phone 403 via the communication interface 405 and processing circuitry 413 via RF circuitry 417. The processing circuitry 413 includes a graphics chip 414 that generates information used by the LCD driver 421. Video content information includes row and column scanning information, pixel color, and/or RGB information, and pixel intensity information corresponding to each frame of video of the received multimedia content.

The LCD driver 421 includes the drive voltage generation module 429 that is responsible for generating drive voltages that are to be applied to liquid crystal pixels of the LCD screen 451. The drive voltage generation module 429 generates drive voltages based on the above information regarding the video content, wherein the information is received by the LCD driver 421 from the processing circuitry 413. The received multimedia content is one or more of real time and/or archived multimedia content such as text, movie, picture, recorded video, streaming video etc. In one embodiment the multimedia content comes from a local memory 411. The local memory 411 shown here is an on-board memory. The local memory 411 may alternately be a removable memory such as a pen drive, a compact disc etc. The multimedia content from the local memory 411 is archived information and reaches the processing circuitry 413 and to be displayed on the LCD 451 by way of interaction of the LCD driver 421 with the processing circuitry 413 that includes the graphics chip 414. Of course, the cellular phone 403 may include additional components in other embodiments such as a Global Positioning System (GPS) receiver, a Wireless Local Area Network (WLAN) transceiver, a Wireless Personal Area Network (WPAN) transceiver, and/or other components.

According to the present embodiment, a video content type detection module 415 sits in between the processing circuitry 413 and the LCD driver 421. The video content type detection module 415 is additional hardware (that may include software) that enables the LCD driver 421 to change its display characteristics based on content of video displayed on the LCD 451. The video content type detection module 415 retrieves information regarding video currently being displayed on the LCD 451 from the processing circuitry 413. The module 415 determines relative display speed of the video from the information regarding the video. Relatively slower video requires relatively slower acting liquid crystal pixels with relatively slower response time compared to relatively faster acting liquid crystal pixels required for fast moving videos. Examples of the slow video and the fast video are a word processor and a video game, respectively. Another set of examples are phonebook application in a cellular phone and a recorded video clip, respectively. Response time of liquid crystal pixels is adjusted by increasing drive voltage of the pixels, though such an increase in the drive voltage causes more power consumption by the cellular phone 403. The video content type detection module 415, upon determining the speed of the video instructs the LCD driver 421 to adjust the pixel drive voltage so as to make the pixel drive voltage optimum. In other words the module 415 triggers a decrease in pixel drive voltage if the video is a slow one and triggers an increase in pixel drive voltage if the video is a fast one.

The video may be, for example, is a movie. The movie has a first portion where the images change very rapidly and a second portion where the images change slowly compared to the first portion. According to the present invention, the second portion of the movie will be properly displayed on the LCD 451 even if the liquid crystal pixels respond slowly during the second portion of the movie. The module 415 initiates a decrease in the pixel drive voltage as soon as the movie reaches the second portion and instructs the LCD driver 421 to generate a pixel drive voltage that is sufficient for proper display of the second portion. The video content type detection module 415 therefore causes a reduction in power consumption by the cellular phone 403 that runs on the battery 409. The module 415 may operate to alter pixel drive voltage on a frame by frame basis. The module 415 determines the pixel drive voltage based on the 1) frequency of row and column scanning and 2) the pixel intensity and colors in each scanning. The module 415 continuously monitors the above characteristics of a video and thereby causes a change in pixel drive voltage as and when required. The module 415 requires a finite time to determine the pixel drive voltage. The module may store a few frames of the video in the memory 411 of the cellular phone 403 to gain this time. A time delay equivalent to the few frames makes no difference to a viewer as long as the frames of the video are displayed in correct order.

The video content type detection module 415 changes the pixel drive voltage based on current activity on the LCD screen 451. As a way of example, at a first instance of time, a video clip is being displayed on the LCD screen 451. The module 415 determines minimum possible pixel drive voltage for the video clip and causes the LCD driver 421 to drive the liquid crystal pixels at the minimum possible pixel drive voltage. At a second instance of time, a user minimizes a window corresponding to the video clip. The pixels continue to be driven by the LCD driver 421 though the user is not watching the video clip. The video content type detection module 415 retrieves information corresponding to the current activity on the LCD screen and causes the LCD driver 421 to stop driving the pixels until the window becomes active. The module 415 needs to communicate with the application that runs the video clip to detect the activity status of the window, i.e., the current activity on the LCD screen 451. In this example the application can be, as an example, a real player or a windows media player. The module 415 communicates with the application via the processing circuitry 413.

The video content type detection module 415 is further adapted to initiate a change in the pixel drive voltage based on charge remaining in the battery 409. The module 415 checks the charge remaining in the battery 409 at regular intervals. The module 415 may perform the checking by interacting with the processing circuitry 413. The module 415 instructs the LCD driver 421 to generate a predefined pixel drive voltage irrespective of speed of the video currently being displayed on the LCD 451 and current activity on the LCD screen 451 when the charge remaining in the battery goes below a threshold level. As a result battery power gets saved although fast moving videos appear blurry on the LCD screen 451. In another embodiment, the video content type detection module 415 causes the pixel drive voltage to be varied based on type of the video and current activity on the LCD screen 451 even when the charge remaining in the battery goes below the threshold level, but causes the pixel drive voltage to be always a few percent, for example 10 percent, below the required pixel drive voltage. Reducing the pixel drive voltage in this way causes all types of videos to be equally affected.

Figure 5:
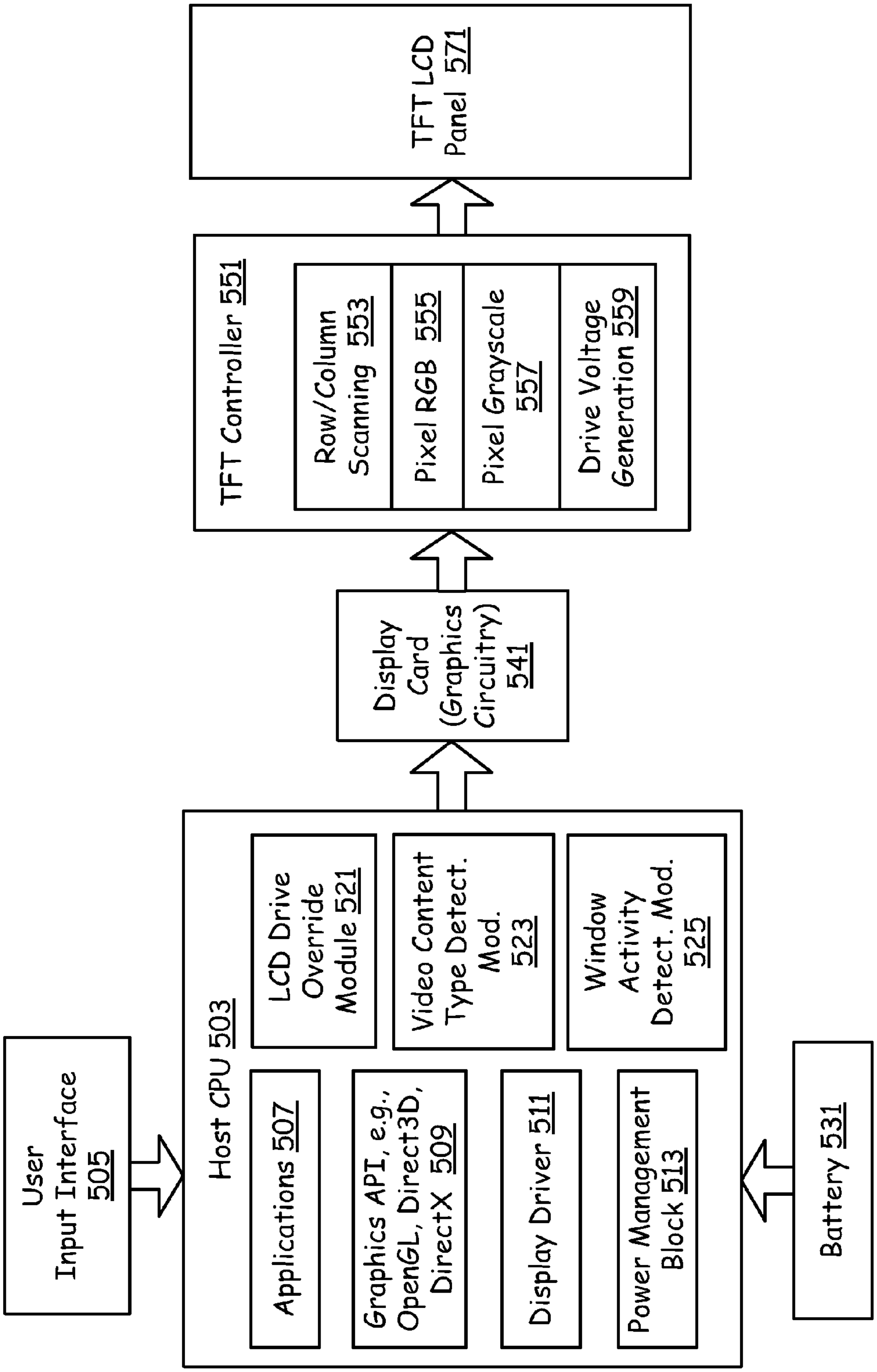
FIG. 5 is a schematic block diagram illustrating a computing device with a central processing unit (CPU) and a display driver that drives a LCD and causes changes in display characteristics of the LCD based on content of video displayed on the LCD according to one or more embodiments of the present invention.

FIG. 5 is a schematic block diagram illustrating a computing device with a central processing unit (CPU) and a display driver that drives a LCD and causes changes in display characteristics of the LCD based on content of video displayed on the LCD according to one or more embodiments of the present invention. The CPU 503 has a display driver 511 that drives a LCD 571 and causes change in display characteristics of the LCD 571 based on content of video displayed on the LCD 571. The LCD 571 is a TFT LCD in the embodiment of FIG. 5. TFTs are arranged on a glass substrate immediately below a layer of liquid crystal pixel elements covered with red, green, and blue filters. The switched on TFTs twist the liquid crystal pixel elements, thereby creating a colored image on the LCD 571. The LCD pixels appear black when liquid crystal pixel elements untwist and return to their original state. The TFTs are switched on by applying voltage to the TFTs. The liquid crystal pixel elements untwist when drive voltage to the TFTs is removed. The elements are made to untwist quickly by applying another drive voltage to the TFTs. The elements need to twist and untwist rapidly in order to display a video, i.e., rapidly changing images/pictures/frames, on the LCD 571. A TFT controller 551 includes a drive voltage generation module 559 that generates and applies drive voltages to the TFTs. The drive voltage generation module 559 generates the drive voltages based on i) row and column scanning information 553, ii) pixel RGB information 555, and iii) pixel gray scale information 557 received by the TFT controller 551 from a display card 541.

The display card 541 is driven by a display driver 511 and may be software that runs on the CPU 503. A graphics Application Program Interface (API) 509 that may run OpenGL, Direct3D, DirectX, or another software application also runs on the CPU 503. The CPU 503 derives power from a battery 531 when the CPU 503 is disconnected from an external power supply. One or more of a variety of applications 507 run on the CPU 503. The applications 507 are, for example and without limitation, a word processor, a media player, a spreadsheet, a drawing tool, a video game, a presentation application, a browser, etc. Each of these applications 507 requires display of pictures and/or videos on the LCD 571. Applications such as the media player and the video game call for rapid change of images on the LCD 571 while applications such as the word processor, the drawing tool, and the browser need images on the LCD 571 to change at a slower rate. A user runs and/or interacts with the applications 507 via a user input interface 505. The CPU 503, the user input interface 505, the battery 531, the display card 541, the TFT controller 551 and the LCD 571 together are found in a plurality of devices, such as a video game box, a personal computer, a notebook, a smart phone etc.

A video content type detection module 523, which may be software or a combination of software and hardware, runs on the CPU 503. The video content type detection module 523 receives information regarding a video being currently displayed on the LCD 571 from the display driver 511. The information regarding the video includes i) frames per second displayed on the LCD 571 and ii) pixel color and intensity for each frame. The video content type detection module 523 determines speed of the video based on the above information and determines desired response time of liquid crystal pixels i.e., how fast the liquid crystal pixels should twist and untwist, based on the speed of the video. The video content type detection module 523 informs the display card 541 about the desired response time. Either the display card 541 or the TFT controller 551 determines desired TFT drive voltage corresponding to the desired response time and the drive voltage generation module 559 generates the desired TFT drive voltage. The video content type detection module 523 studies the information regarding the video once per frame and therefore may trigger a change in the desired response time once per frame. In another embodiment the module 523 triggers a change in the desired response once per second or at another time interval. In yet another embodiment the module 523 retrieves the information regarding video corresponding to an application when the application begins thereby causing the TFT controller 551 to change the TFT drive voltage once per active application change.

The video content type detection module 523 may set the desired response time of the liquid crystal pixels to a value that is required for fastest video among a plurality of videos running on the CPU 503 simultaneously. As an example, at a first instance of time, a video game, a word processor and a presentation application are running on a first window, a second window and a third window, respectively. The video content type detection module 523 sets the desired response time to a value required for proper display of the video game, though the word processor and the presentation application are displayed properly with a lower response time. At a second instance of time a user minimized the first window and overlays the second window on the third window because the user works with the word processor only. A window activity detection module 525 is another piece of software that runs on the CPU 503 and is adapted to sense if a window is visually active. At the second instance of time, the window activity detection module 525 senses that the second window is visually active and the first window and the third window are visually inactive. The window activity detection module 525 forwards information regarding activity of currently open windows to the video content type detection module 523. The module 523, in response to the information from the window activity detection module 525, sets the desired response time of the liquid crystal pixels to a lower value that is sufficient for proper display of the word processor. The video content type detection module 523 and the window activity detection module 525 cause saving in power by driving the liquid crystal pixels at optimum drive voltage. A power management block 513 that runs on the CPU 503, which may be software and/or hardware also functions to assist in power savings operations.

A LCD drive override module 521 causes a change in pixel drive voltage based on an input entered via the user input interface 505. The user input interface 505 is one or more of a variety of a keyboard and a mouse, a touch screen, a joystick, a pen and a touch pad, a thumbwheel etc. The LCD drive override module 521 may be software that runs on the CPU 503. A user inputs a data, using the user input interface 505, in an applet that shows current LCD drive settings and a range of possible LCD drive settings. The applet forwards the data to the LCD drive override module 521 which, in response to the data, determines a new LCD drive setting based on the data and instructs the video content type detection module 523 to drive the LCD 571 with the new LCD drive setting. The video content type detection module 521 ceases to monitor video content and modify LCD drive power as long as the LCD drive override module 521 continues to override LCD drive settings. The LCD drive override module 521 is adapted to override the LCD drive settings for a short period of time, for example, a few minutes. The LCD drive settings revealed by the applet to the user comprise one or more of, for example and without limitation, i) range of speeds of video supported by the LCD 571 on a 5 point relative scale, and ii) possible values for brightness of the LCD screen 571 on a 3 point relative scale. As an example, the data entered by the user asks for a video speed 3 and LCD brightness 3. In response to the data, the LCD drive override module 521 instructs the video content type detection module 523 to drive the LCD 571 at maximum brightness and at medium response time that is sufficient to display videos of medium speed i.e., videos having a speed 3 on the 5 point relative scale. The video content type detection module 523 determines desired pixel response time corresponding to desired screen brightness and desired video speed support and informs the display card 541 about the desired pixel response time.

Figure 6:
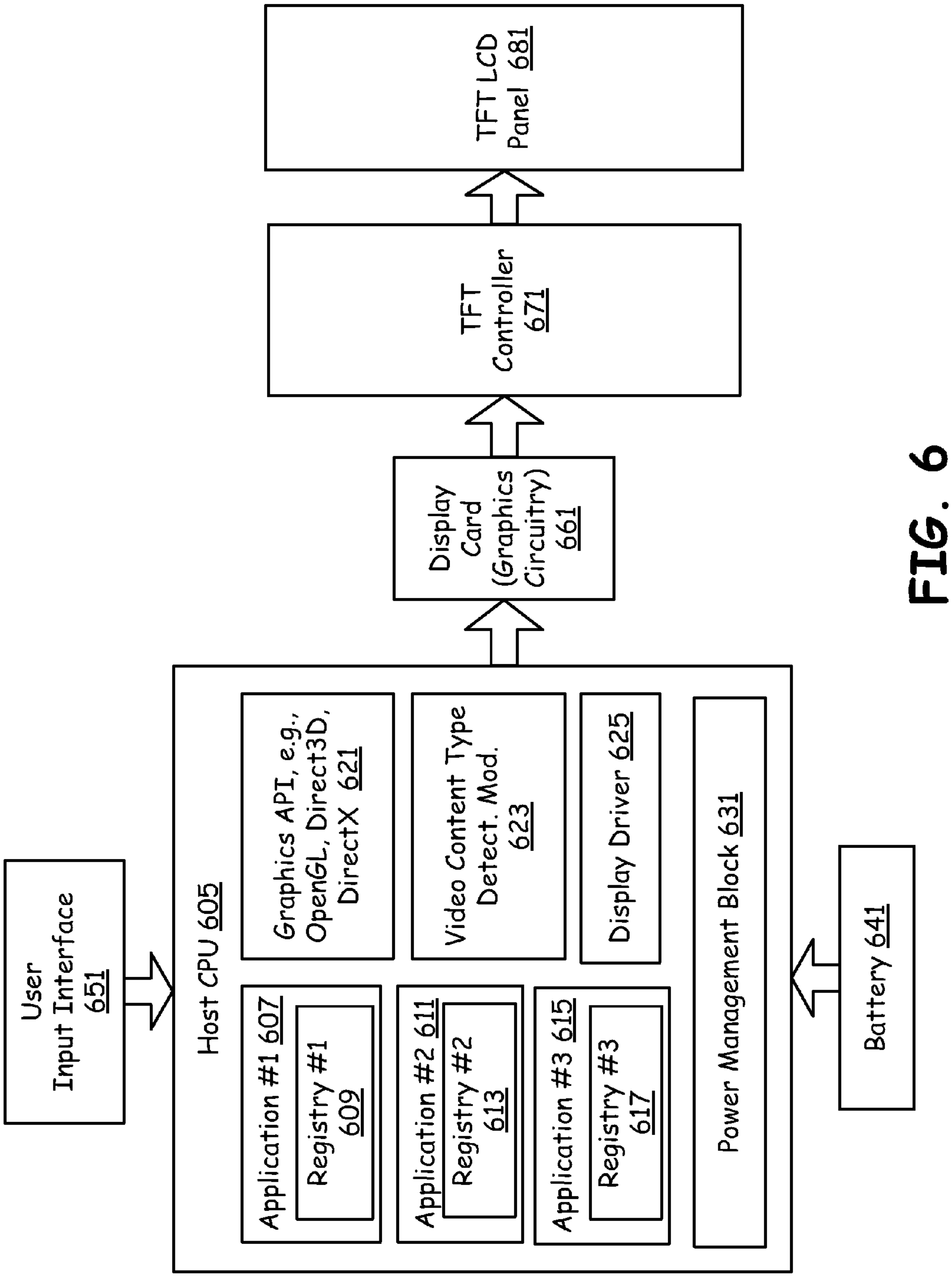
FIG. 6 is a schematic block diagram illustrating a computing device with a CPU and a display driver that drives a LCD and causes changes in display characteristics of the LCD on an application by application basis according to one or more embodiments of the present invention.

FIG. 6 is a schematic block diagram illustrating a computing device with a CPU and a display driver that drives a LCD and causes changes in display characteristics of the LCD on an application by application basis according to one or more embodiments of the present invention. With the embodiment of FIG. 6, a display driver 625 triggers a change in the display characteristics of the LCD 681 once per application based on display characteristic requirement identified by each of a plurality of applications. The plurality of applications 607, 611, and 615 running on the CPU 605 are one or more of a video game, a media player, a word processor, a spreadsheet, a drawing tool, a presentation application, a browser, a streaming video application etc. Each of the plurality of applications identifies minimum display characteristics required for proper display of the application on the LCD 681 and stores the requirement in corresponding registry entries 609, 613, and 617. The display characteristics corresponding to an application are one or all of a) frames per second, and b) how fast contents of images are expected to change between consecutive frames.

As an example, a video game requires a relatively larger number of frames or images to be displayed per second on the LCD 681 so that fast moving objects in the video game appear properly on the LCD 681. The content of images change slowly between consecutive frames in a word processor application because the change in the contents of the images depend on how fast a user of the word processor enters data via the user input interface 651. A first application 607, for example the video game, a second application 611, for example the word processor and a third application 615, for example a media player store the corresponding minimum display characteristics in a first registry 609, a second registry 613 and a third registry 617 respectively. The display driver 625 retrieves a minimum display characteristic corresponding to an application from the corresponding registry when the application starts. The display driver 625 determines LCD drive voltage based on the minimum display characteristic and directs the display card 661 to drive the LCD 681 at the determined drive voltage as long as the application runs on the CPU 605. As a way of example, a spreadsheet application and a browser are running simultaneously on the CPU 605 and are displayed on the LCD 681 on two separate windows. The display driver 625 directs the display card 661 to apply a LCD drive voltage that corresponds to minimum display characteristic identified by the browser because the minimum display characteristic identified by the browser is higher than minimum display characteristics identified by the spreadsheet.

The CPU 605 is powered by a battery 641 when the device housing the CPU 605 is unplugged. The battery 641 interacts with the display driver 625 via a power management block 631. The power management block 631 is may be software that runs on the CPU 605, hardware, or a combination of both. The power management block 631 is adapted to override display characteristic setting when the battery power goes below a predefined value. In one embodiment the power management block 631 is adapted to fully override the display characteristic setting. The power management block 631 saves battery power by setting the LCD drive voltage to a low value corresponding to a slow video irrespective of type of one or more applications currently displayed on the LCD 671. In another embodiment the power management block 631 is adapted to partially override the display characteristic setting. The block 631 may define a set of possible display characteristics, for example possible video speeds, and forces applications running on the CPU 603 to identify a speed from the above set. The set of video speeds, as an example, does not include a video speed required in a video game. The power management block 631 ensures that LCD 671 is driven by high power when the battery power is below a predefined value. In such a case a video game running on the CPU 603 ends up selecting a video speed less than its requirement.

In another embodiment of the present invention, the display driver 625 does not drive the LCD 681 to untwist quickly when a slow video is displayed on the LCD 681, thereby saving power and allowing the liquid crystal pixels to untwist naturally. The liquid crystal pixels need a finite time to untwist naturally. The display driver 625 applies a drive voltage to the LCD 681 for untwisting when a fast response time is required for properly displaying a fast video on the LCD 681. In yet another embodiment, the TFT controller 671 measures hysteresis or time lag between application of the drive voltage to the LCD 681 and formation of image on the LCD 681. The hysteresis is due to finite time taken by the liquid crystal pixels to twist and/or untwist. The TFT controller 671 forwards the hysteresis value to the display driver 625 via the display card 661. The display driver 625 triggers the display card 661 to increase the LCD drive voltage in steps and consequently causing the hysteresis value to decrease until the hysteresis value crosses a predefined threshold. The display driver 625 causes a decrease in the LCD drive voltage if the hysteresis value is below the predefined threshold.

The CPU 605 may also run a graphics API and a video content detection module 623 that operate to process video according to the present invention. The operation of the video content type detection module 623 was described previously herein and is not described further with respect to FIG. 6.

Figure 7:
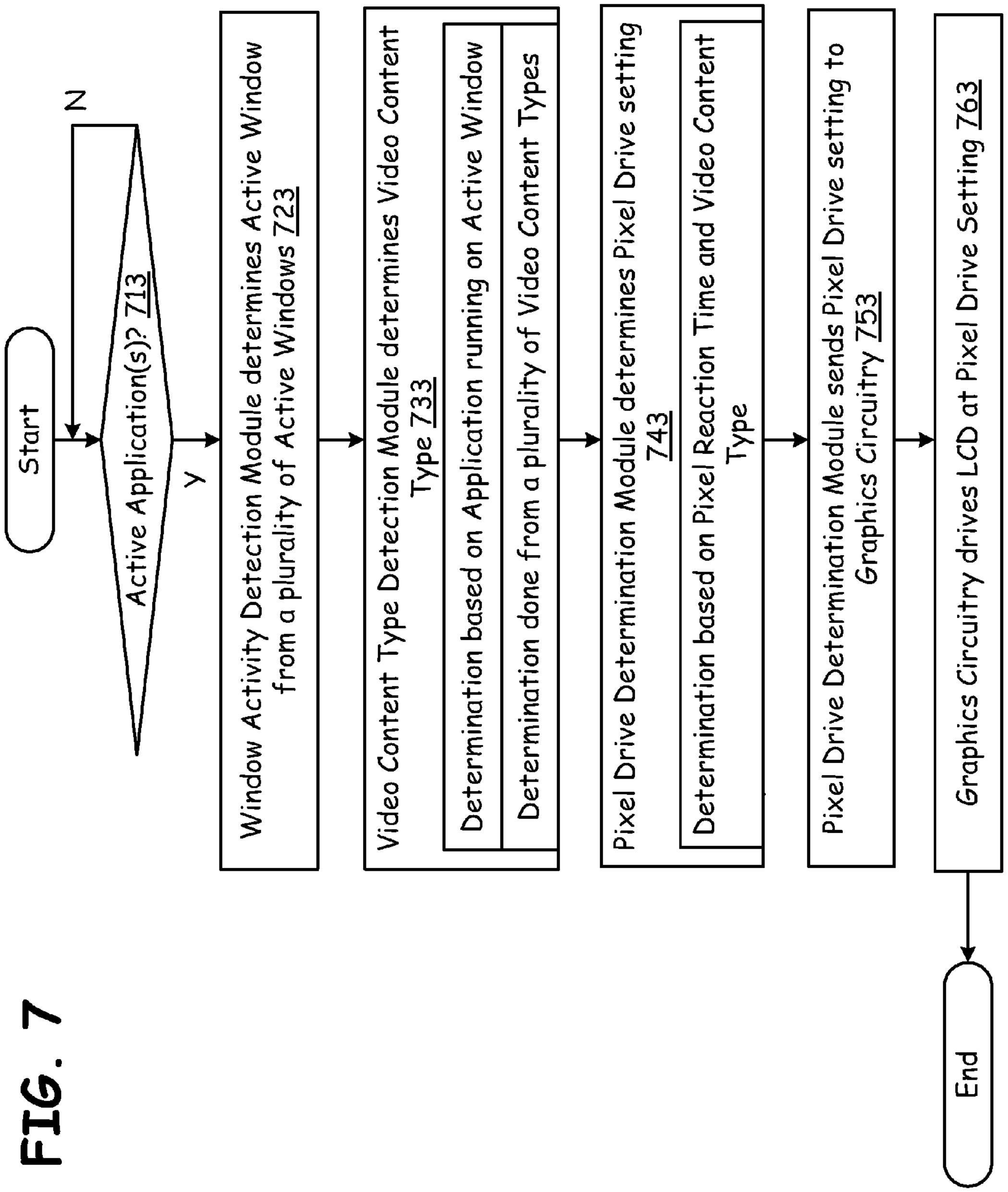
FIG. 7 is a flow chart illustrating operation of driving a LCD based upon content of video displayed on the LCD of a host device according to one or more embodiments of the present invention.

FIG. 7 is a flow chart illustrating operation of driving a LCD based upon content of video displayed on the LCD of a host device according to one or more embodiments of the present invention. Operation begins at step 713 with the host device determining if a video application is currently active. The host device is one or more of a notebook, a personal computer, a video game box, a cellular phone, a television, a smart phone etc. The video application is, for example and without limitation, a video game, a media player, a word processor, a presentation tool, a streaming video application, a spreadsheet, a TV program etc. As a way of example, a plurality of video applications runs on the host device and in a plurality of windows. A window activity detection module in the host device determines which window from the plurality of windows is currently active in a next step 723. In a step 733, a video content type detection module determines video content type of a video corresponding to an application running on the active window. The video content type detection module is one or combination of a software and a hardware. In one embodiment the video content type detection module is a part of a display driver running on the host device. In another embodiment the video content type detection module is part of a graphics circuitry in the host device. The video content type detection module selects the video content type from a plurality of video content types. For example, the video content type detection module is aware of range of speeds of videos that are supported by the LCD that is driven by the graphics circuitry in the host device. The video content type detection module selects the video content type, based on characteristics of the video, such as frames per second requirement of the video, and/or type of application, such as if an application is a high speed application like a game video or a slow speed application like a word processor.

The video content type detection module forwards the video content type to a pixel drive determination module in a step 743. The pixel drive determination module determines a pixel drive setting, such as a pixel drive power, based on the video content type and minimum possible response time of liquid crystal pixels. The pixel drive determination module sets pixel drive power to a higher value for a game video than pixel drive power for a word processor because pixels under a high drive power responds faster to input images thereby rendering fast changing images i.e., a high speed video on the LCD. The pixel drive determination module forwards the pixel drive setting to the graphics card in a step 753 and the graphics card drives the LCD at the pixel drive setting. The method then ends. In one embodiment the method is performed every time a new application starts running on the host device. In another embodiment the method is performed at regular intervals, such as once every 5 minutes.

Figure 8:
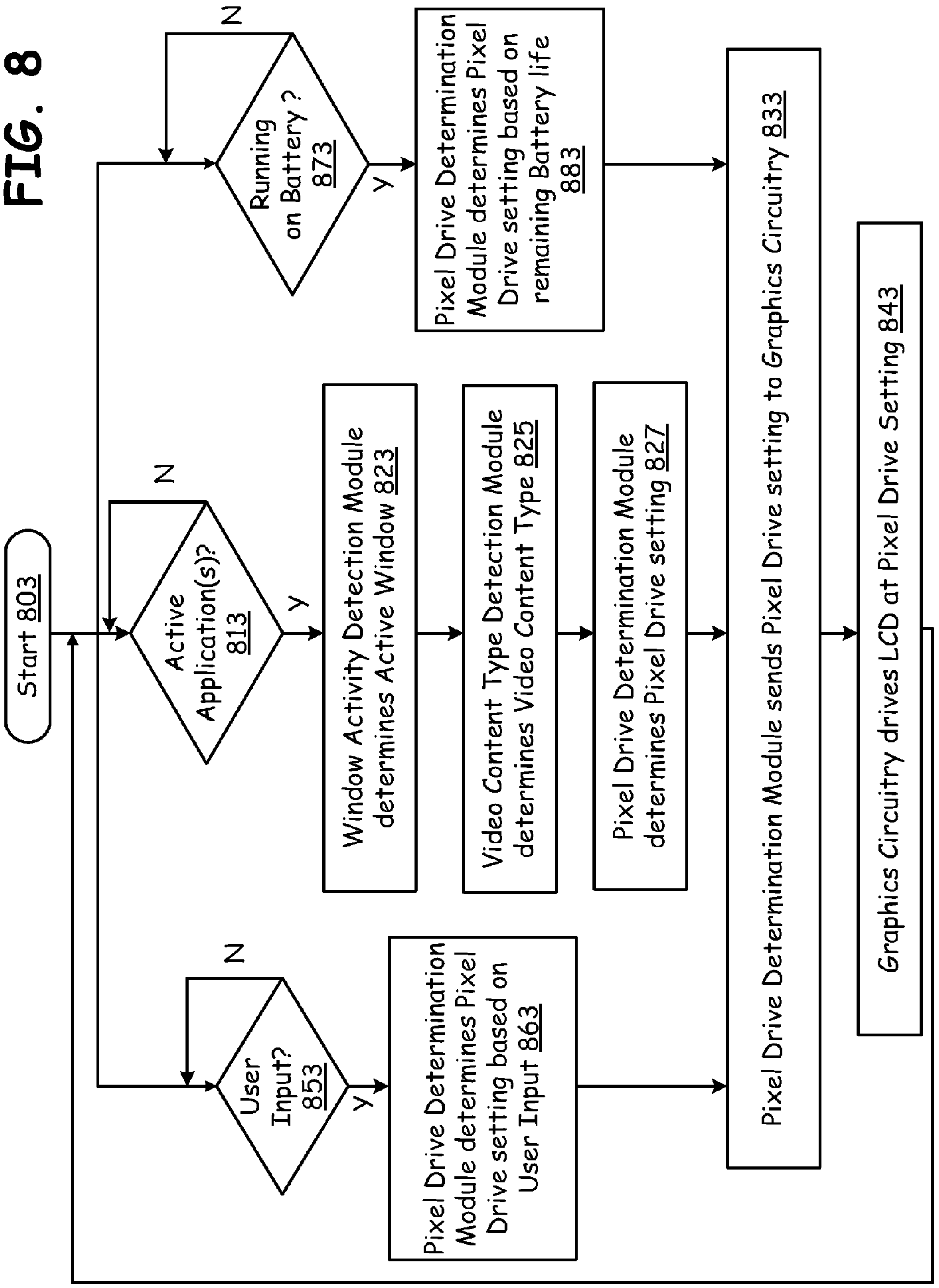
FIG. 8 is a flow chart illustrating further the method of FIG. 7 where LCD pixel drive settings are based on user input and/or remaining battery life of the host device.

FIG. 8 is a flow chart illustrating further the method of FIG. 7 where LCD pixel drive settings are based on user input and/or remaining battery life of the host device. The method begins at step 803. The window activity detection module, the video content type detection module and the pixel drive setting determination module perform according to FIG. 7 and as described in steps 813, 823, 825 and 827 if there is no user input received at step 853 and the host device is plugged in. In a step 863, the pixel drive determination module determines the pixel drive setting based on a user input neglecting the video content type determined by the video content determination module in the step 825. The user input is, for example, a desired speed. The user is prompted to enter the desired speed of a video by way of interacting with an applet. The applet allows the user to choose the desired speed from a range of video speeds supported by the LCD. If the host device is running on a battery, the pixel drive determination module chooses a predetermined pixel drive setting that is appropriate for low speed videos and neglects the video content type determined by the video content determination module in the step 825. Running the LCD at the predetermined pixel drive setting causes high speed videos to be displayed improperly on the LCD, but saves battery power. In another embodiment the pixel drive determination module selects a new pixel drive setting based on a) remaining battery life, and b) the pixel drive setting determined in the step 827. For example and without limitation, the new pixel drive setting is 2 steps below the pixel drive setting determined in the step 827 if 50% of battery power is left. The pixel drive determination module selects the new pixel drive setting to be 4 steps below the pixel drive setting determined in the step 827 if 25% of battery power is left. The pixel drive determination module forwards the pixel drive setting to the graphics circuitry in a step 833 and the graphics circuitry drives the LCD at the pixel drive setting in a step 843. The method of determining i) whether one or more applications are active, ii) whether a user input is present and iii) whether the host device is running on battery continues as long as the host device is switched on. When the device is running on battery power as determined at step 873, the pixel drive determination module at step 883 may determine pixel drive settings based upon remaining battery life.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output (s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A system comprising:

a Liquid Crystal Display (LCD);

LCD driver circuitry coupled to the LCD display operable to:

determine a video content type from a plurality of video content types; and select pixel drive settings based upon the video content type.

2. The system of claim 1, further comprising processing circuitry operably coupled to the LCD driver circuitry and operable to communicate the video content type to the LCD driver circuitry.

3. The system of claim 2, wherein the processing circuitry is operable to:

determine an active window from a plurality of windows; and determine the video content type based upon the active window.

4. The system of claim 2, wherein the processing circuitry is operable to:

determine an active application program from a plurality of application programs, and determine the video content type based upon the active application program.

5. The system of claim 1:

further comprising a user interface module operably coupled to the LCD driver circuitry and operable to receive user input pixel drive preferences; and the LCD driver circuitry operable to use the user input pixel drive preferences to determine the pixel drive settings.

6. The system of claim 1, wherein the LCD driver circuitry further operable to consider power consumption in selecting the pixel drive settings.

7. The system of claim 1, wherein the LCD has a plurality of pixel drive settings, and the LCD driver circuitry is operable to select the pixel drive settings from the plurality of pixel drive settings.

8. The system of claim 1, wherein the LCD has continually variable pixel drive settings from a slowest drive setting to a fastest drive setting, the LCD driver circuitry operable to select the pixel drive settings in a range from the slowest drive setting to the fastest drive setting.

9. Controller circuitry comprising:

pixel drive circuitry for coupling to a Liquid Crystal Display (LCD) and operable in either a first mode based on at least a first LCD drive characteristic or in a second mode based on at least a second LCD drive characteristic; and processing circuitry, operably coupled to the pixel drive circuitry and operable to select the first mode to support a first type of video content or the second mode to support a second type of video content, the first type of video content changing at a rate that is relatively faster than that of the second type of video content.

10. The controller circuitry of claim 9, wherein:

the first type of video content and the second type of video content together comprise video data; and the processing circuitry is operable to analyze the video data to identify the first type of video content and the second type of video content.

11. The controller circuitry of claim 10, further comprising memory operable to queue the video data to support the analysis by the processing circuitry.

12. The controller circuitry of claim 9, wherein the processing circuitry operably couples to host processing circuit, the host processing circuit operable to direct the processing circuitry in the selecting the first mode or the second mode.

13. The controller circuitry of claim 12, wherein the host processing circuit is operable to process a software application, wherein the software application is operable to control the host processing circuit to direct the processing circuitry.

14. The controller circuitry of claim 13, wherein the control by the software application is governed by user interaction.

15. The controller circuitry of claim 13, wherein the software application comprises at least one of:

operating system program code;

a user application;

a device driver; and a graphics API (Application Programming Interface).

16. The controller circuitry of claim 9, wherein:

the LCD has a first power consuming mode and a second power consuming mode, the first power consuming mode being relatively higher than the second power consuming mode; and the pixel drive circuitry is operable in the first mode to support the first power consuming mode and in the second mode to support the second power consuming mode.

17. The controller circuitry of claim 9, wherein the LCD has a first pixel response mode and a second pixel response mode, the first pixel response mode being relatively faster than the second pixel response mode, and the drive circuitry operates in the first mode to support the first pixel response mode of the LCD and in the second mode to support the second pixel response mode.

18. The controller circuitry of claim 9, wherein:

the first LCD drive characteristic comprises a first pixel untwisting characteristic;

the second LCD drive characteristic comprises a second pixel untwisting characteristic; and the first pixel untwisting characteristic being relatively slower than the second pixel untwisting characteristic.

19. A method comprising:

operating pixel drive circuitry coupled to a LCD (Liquid Crystal Display) in a first mode having first pixel drive characteristics and in a second mode having second pixel drive characteristics;

interacting, by processing circuitry, with the pixel drive circuitry to select the first mode to support a first type of video content; and interacting, by the processing circuitry, with the pixel drive circuitry to select the second mode to support a second type of video content, the first type of video content changing at a rate that is relatively faster than that of the second type of video content.

20. The method of claim 19:

wherein the first type of video content and the second type of video content together comprise video data; and further comprising analyzing the video data to identify the first type of video content and the second type of video content from the video data.

21. The method of claim 19, further comprising:

displaying the first video content in a first portion of the LCD;

displaying concurrently the second video content in a second portion of the LCD; and operating the first portion of the LCD in the first mode; and operating the second portion of the LCD in the second mode.

* * * * *